United States Patent [19]
Niimi et al.

[11] Patent Number: 6,146,753
[45] Date of Patent: Nov. 14, 2000

[54] ANTISTATIC HARD COAT FILM

[75] Inventors: Takahiro Niimi; Mitsuru Tsuchiya; Hiroomi Katagiri, all of Shinjuku-Ku, Japan

[73] Assignee: Dai Nippon Printing Co., Ltd., Japan

[21] Appl. No.: 09/083,428

[22] Filed: May 21, 1998

[30] Foreign Application Priority Data

May 26, 1997 [JP] Japan .................................. 9-149907

[51] Int. Cl.$^7$ ....................................................... B32B 3/00
[52] U.S. Cl. .......................... 428/332; 428/208; 428/323; 428/480
[58] Field of Search ...................................... 428/206, 208, 428/323, 480, 403, 407, 922, 926; 361/212

[56] References Cited

U.S. PATENT DOCUMENTS 4,528,222  7/1985  Rzpecki et al. ......................... 428/35
4,746,574  5/1988  Hattori et al. ......................... 428/409

Primary Examiner—William Krynski
Assistant Examiner—B. Shewareged
Attorney, Agent, or Firm—Parkhurst & Wendel, L.L.P

[57] ABSTRACT

An antistatic hard coat film for various displays is provided which can prevent electrostatic deposition of foreign materials and at the same time possesses excellent scratch resistance and hardness high enough not to cause a deterioration in transparency upon being rubbed. The antistatic hard coat film 5 comprises: a transparent substrate film 1; a transparent conductive layer 2, having a surface resistivity of preferably not more than $10^{12}$ Ω/□, provided on the substrate film 1; and a hard coat 3 provided on the transparent conductive layer 2, the hard coat 3 preferably having such an anisotropic conductivity that the resistivity in the layer surface direction is higher than the resistivity in the layer thickness direction.

5 Claims, 3 Drawing Sheets

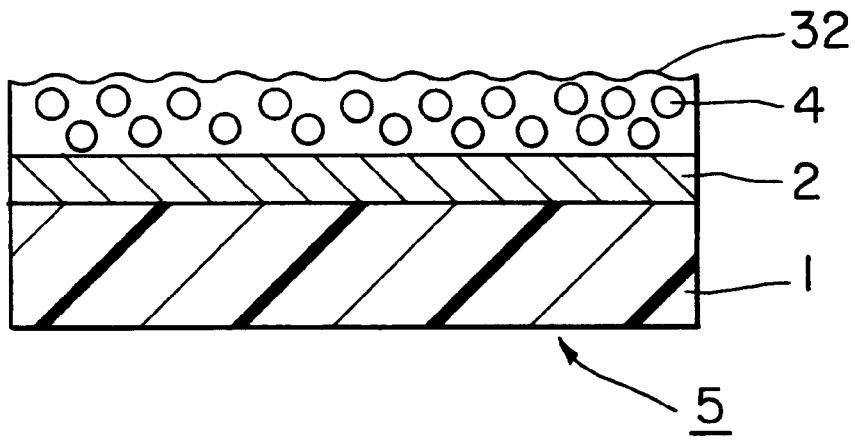
F I G. 4
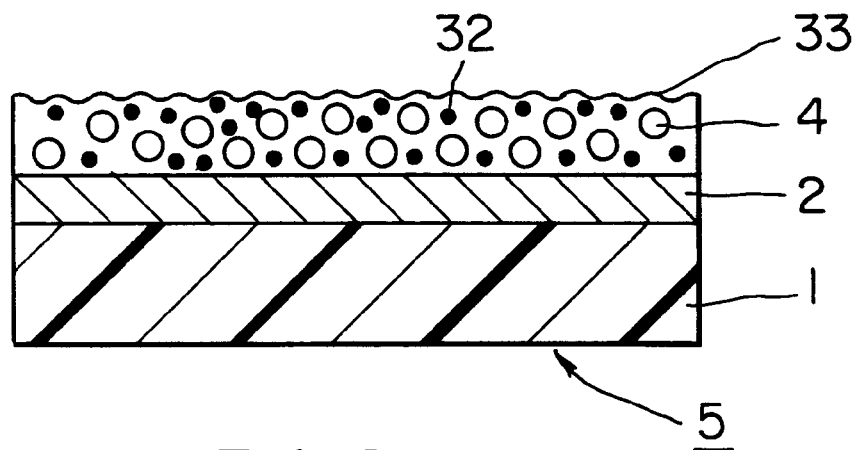
F I G. 5
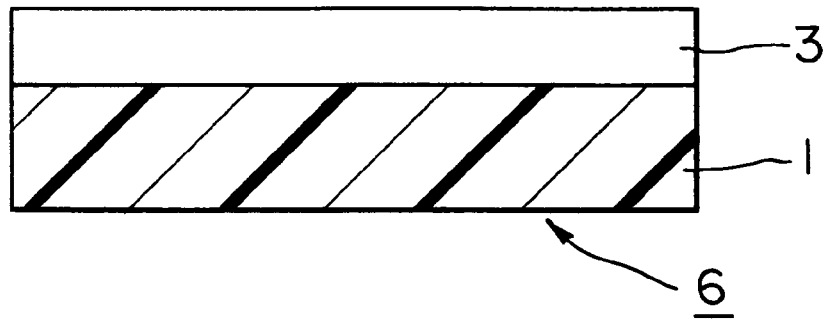
F I G. 6

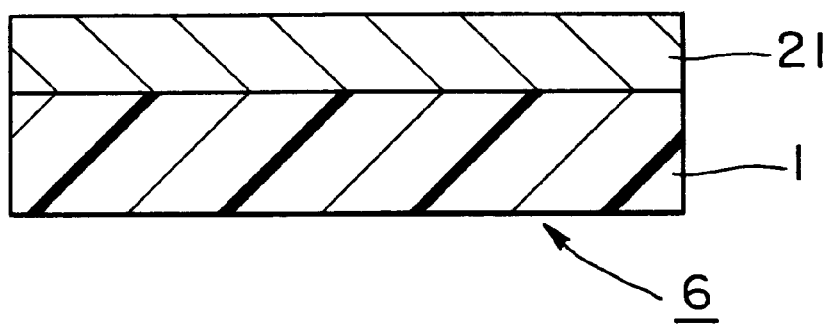
F I G. 7
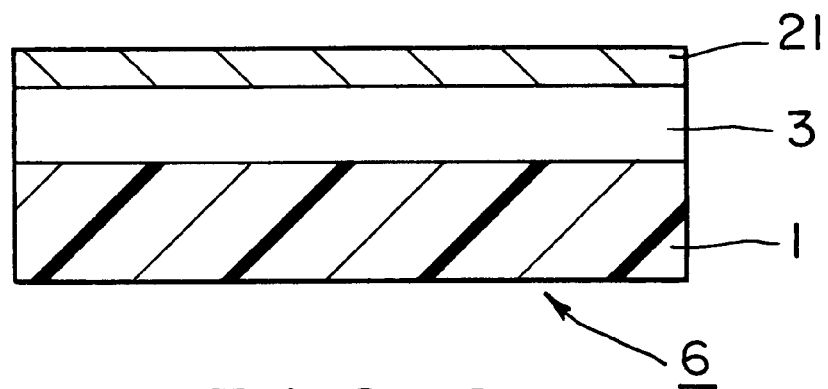
F I G. 8
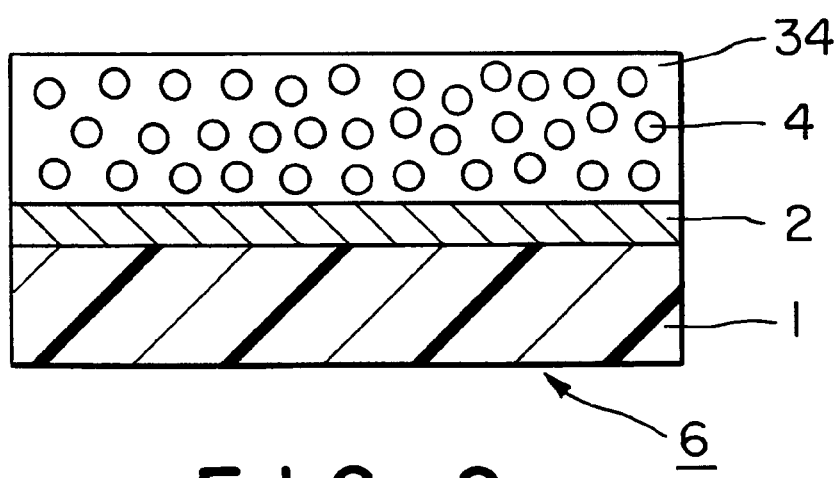
F I G. 9

ANTISTATIC HARD COAT FILM

BACKGROUND OF THE INVENTION

The present invention relates to a dust-proof, scratch-resistant film. More particularly, the present invention relates to a transparent film that is excellent in prevention of soiling created by deposition of dust, on the surface of various displays of word processors, computers, and televisions, surfaces of polarizing plates used in liquid crystal displays, optical lenses, such as sunglass lenses of transparent plastics, lenses of eyeglasses, finder lenses for cameras, covers for various instruments, and surfaces of window glasses of automobiles and electric rail cars, and at the same time possesses excellent scratch resistance.

Glass plates and transparent resin plates, such as transparent plastic plates, are used in curve mirrors, back mirrors, goggles, and window glasses, particularly displays of electronic equipment, such as personal computers and word processors, and other various commercial displays. These resin plates, as compared with the glass plates, are lightweight and less likely to be broken, but on the other hand, they are disadvantageous in that dust is electrostatically deposited on the surface thereof and, in addition, the hardness is so low that the scratch resistance is poor and, hence, a scratch is created deteriorating the transparency.

Conventional methods for preventing the electrostatic deposition of dust and the deterioration in transparency created by scratching upon being rubbed include coating of an antistatic paint on the surface of the plastic and formation of a hard coat on the surface of the plastic.

The hard coat with a conductive material, such as an antistatic agent, being dispersed in an amount large enough to prevent the deposition of foreign materials, however, has unsatisfactory transparency and is further disadvantageous in that curing is inhibited making it impossible to provide hardness high enough to meet the scratch resistance requirement.

A highly transparent conductive thin film can be formed by vapor deposition of a metal oxide or the like. The process of vapor deposition, however, is inefficient to cause increased cost and has an additional disadvantage that the scratch resistance of the formed thin film is unsatisfactory.

DISCLOSURE OF THE INVENTION

Accordingly, an object of the present invention is to provide an antistatic hard coat film that, when used in various displays for observing visual information, such as an object, a letter, or a figure, through a transparent substrate, or used in mirrors for observing an image from a reflective layer through a transparent substrate, can prevent electrostatic deposition of foreign materials on the surface of the transparent substrate and at the same time has hardness high enough not to cause a deterioration in transparency due to a scratch or the like upon being rubbed.

The hard coat film according to the present invention can maintain the transparency on such a level as will not cause a problem associated with the perception of an image seen through the film.

In order to solve the above problems, the present invention provides an antistatic hard coat film comprising: a transparent substrate film; a transparent conductive layer provided on the substrate film; and a hard coat layer provided on the transparent conductive layer.

According to a preferred embodiment of the present invention, the transparent conductive layer has a surface resistivity of not more than $10^{12}$ Ω/□.

Further, according to a preferred embodiment of the present invention, the hard coat layer has a volume resistivity in the thickness direction of not more than $10^8$ Ω·cm.

According to another preferred embodiment of the present invention, the hard coat layer comprises a reaction-curing resin composition and has a thickness of 1 to 50 μm.

Further, according to another preferred embodiment of the present invention, the hard coat layer comprises an anisotropic conductive hard coat layer having a higher volume resistivity in the layer surface direction and a lower volume resistivity in the layer thickness direction.

Preferably, the anisotropic conductive layer comprises a hard coat resin comprising conductive fine particles, the diameter of the conductive fine particles being not less than one-third of the coating thickness of the anisotropic conductive layer.

Further, preferably, the conductive fine particles are particles which have been surface treated with gold and/or nickel.

BRIEF DESCRIPTION OF THE DRAWINGS

FIG. 4 is a schematic cross-sectional view of an antistatic hard coat film having surface irregularities according to an embodiment of the present invention;

FIG. 5 is a schematic cross-sectional view of an antistatic hard coat film having a matted surface according to an embodiment of the present invention;

FIG. 6 is a schematic cross-sectional view of a comparative hard coat film;

FIG. 7 is a schematic cross-sectional view of a comparative antistatic hard coat film;

FIG. 8 is a schematic cross-sectional view of another comparative antistatic hard coat film; and FIG. 9 is a schematic cross-sectional view of a further comparative antistatic hard coat film.

BEST MODE FOR CARRYING OUT THE INVENTION

Figure 1:
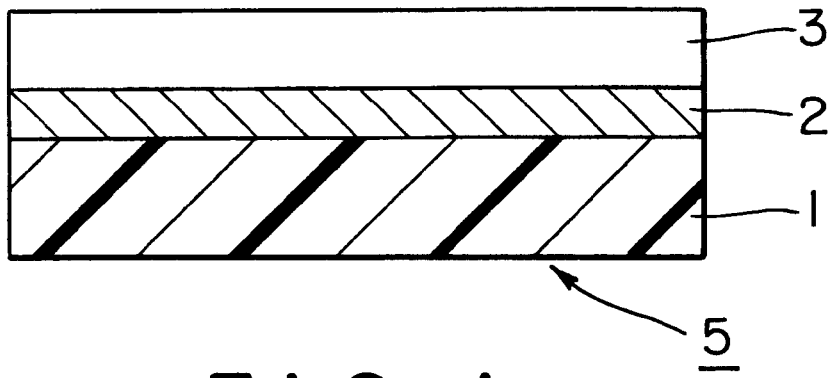
FIG. 1 is a schematic cross-sectional view showing a fundamental construction of the antistatic hard coat film according to the present invention.

As shown in FIG. 1, the antistatic hard coat film of the present invention is an antistatic hard coat film 5 comprising: a transparent substrate film 1; a transparent conductive layer 2 provided on the substrate film; and a hard coat 3 provided on the transparent conductive layer.

Preferably, the surface resistivity of the transparent conductive layer 2 is not more than $10^{12}$ Ω/□, more preferably not more than $10^8$ Ω/□.

Further, the volume resistivity in the thickness direction of the hard coat 3 is preferably not more than $10^8$ Ω·cm, preferably not more than $10^3$ Ω·cm.

Furthermore, preferably, the hard coat 3 comprises a reaction-curing resin composition and has a thickness of 1 to 50 μm.

Figure 2:
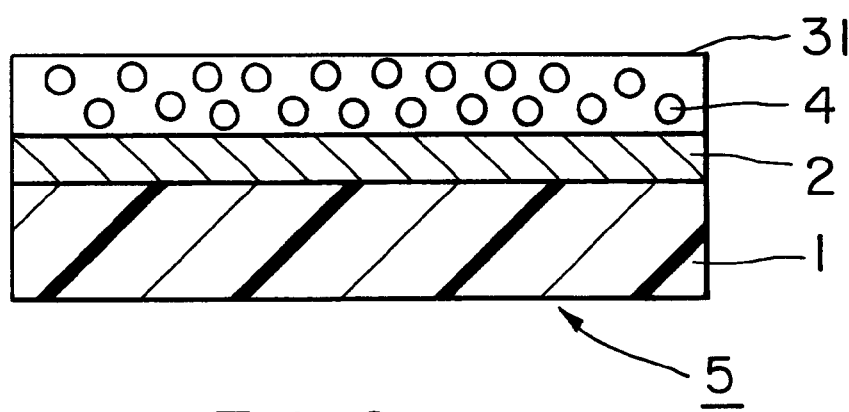
FIG. 2 is a schematic cross-sectional view showing an antistatic hard coat film according to an embodiment of the present invention.

As shown in FIG. 2, preferably, the hard coat 3 is constituted by an anisotropic conductive hard coat 31 having a higher volume resistivity in the layer surface direction and a lower volume resistivity in the layer thickness direction.

Further, preferably, the anisotropic conductive hard coat 3 comprises a hard coat resin comprising conductive fine particles 4, the diameter of the conductive fine particles being not less than one-third of the coating thickness of the anisotropic conductive layer.

In this case, the conductive fine particles 4 are preferably particles that have been surface treated with gold and/or nickel. Preferably, the particles in this case are selected from the group consisting of silica, carbon black, metallic, and resin particles.

The transparent substrate film according to the present invention is preferably constituted by a stretched or unstretched film of a thermoplastic resin, such as cellulose triacetate, polyester, polyamide, polyimide, polypropylene, polymethylpentene, polyvinyl chloride, polyvinyl acetal, methyl polymethacrylate, polycarbonate, or polyurethane.

A conductive layer comprising conductive fine particles and a reaction-curing resin composition may be coated on the transparent substrate film. Alternatively, a metal oxide or the like may be formed on the transparent substrate film by a conventional method, such as vapor deposition or sputtering. The conductive layer may be formed on the substrate film either directly or through a primer layer that can enhance the bonding.

The coating may be performed by a conventional method selected from roll coating, gravure coating, bar coating, extrusion coating and the like according to the properties and coverage of the coating composition.

Conductive fine particles which may be preferably used in the conductive layer according to the present invention include fine particles of antimony-doped indium-tin oxide (hereinafter referred to as "ATO") and indium-tin oxide (ITO).

A conductive thin film formed by vapor deposition or sputtering of a transparent metal or metal oxide may constitute the conductive layer.

Preferably, the reaction-curing resin composition for constituting the conductive layer is selected from those that have good adhesion to the substrate film, are lightfast and moisturefast as a resin composition, and have good adhesion to an anisotropic conductive layer provided on the conductive layer.

The anisotropic conductivity referred to in the present invention means that, as given in the following formula, the volume resistivity in the layer surface direction ($P_{VH}$) is at least ten times larger than the volume resistivity in the layer thickness direction ($P_{VV}$):

$$P_{VH} \geq 10 \times P_{VV}$$

When the above relationship is not satisfied, it cannot be generally said that the conductive layer has anisotropic conductivity.

Preferred examples of the conductive thin layer provided by vapor deposition or sputtering include those of ITO, ATO, gold, nickel, and zinc oxide/aluminum oxide. Preferred examples of the conductive layer which may be provided by coating include those of polypyrrole and polyaniline.

Preferably, the resin composition for constituting the conductive layer according to the present invention comprises an alkyd resin, an oligomer or a prepolymer of an (meth)acrylate (the term "(meth)acrylate" used therein referring to both acrylate and methacrylate) of a polyfunctional compound such as a polyhydric alcohol, and a relatively large amount of a reactive diluent. Diluents usable herein include: monofunctional monomers, such as ethyl (meth) acrylate, ethylhexyl (meth)acrylate, styrene, vinyltoluene, and N-vinylpyrrolidone; and polyfunctional monomers, for example, trimethylolpropane tri(meth)acrylate, hexanediol (meth)acrylate, tripropylene glycol di(meth)acrylate, diethylene glycol di(meth) acrylate, pentaerythritol tri(meth) acrylate, dipentaerythritol hexa(meth)acrylate, 1,6-hexanediol di(meth)acrylate, and neopentyl glycol di(meth) acrylate.

When use of the above ionizing radiation curing resin as an ultraviolet curing resin is contemplated, a photopolymerization initiator, such as an acetophenone, a benzophenone, Michler's benzoyl benzoate, α-amyloxime ester, or a thioxanthone, or a photosensitizer, such as n-butylamine, triethylamine, or tri-n-butylphosphine, are incorporated into the resin composition.

The ionizing radiation curing resin may contain the following reactive organosilicon compound.

The reactive organosilicon compound is a compound represented by the formula $R_m Si(OR')_n$ wherein R and R' represent an alkyl group having 1 to 10 carbon atoms and m and n are each an integer, provided that m+n=4. More specific examples of the reactive organosilicon compound include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

The thickness of the conductive layer formed by coating is preferably 0.5 to 5 μm, more preferably not less than 1 μm (the coverage in the present specification being expressed in terms of weight basis; the same shall apply hereinafter). When the thickness is less than 0.5 μm, it is difficult to bring the surface resistivity of the conductive layer formed on the transparent substrate film to not more than $10^{12}$ Ω/□. On the other hand, when the thickness is more than 5 μm, the transparency of the conductive layer is in some cases unfavorably lowered.

In the present invention, as described above, the surface resistivity of the transparent conductive layer is preferably not more than $10^{12}$ Ω/□, more preferably not more than $10^8$ Ω/□. When the surface resistivity of the transparent conductive layer exceeds $10^{12}$ Ω/□, good antistatic effect cannot be unfavorably developed.

The hard coat layer according to the present invention is preferably constituted by an anisotropic conductive layer. The anisotropic conductive layer is a layer, coated on the conductive layer, that has hardness high enough to provide excellent scratch resistance and does not extremely deteriorate the conductivity.

The reaction-curing resin composition for the anisotropic conductive hard coat may be one that can be strongly adhered to the conductive layer. In this case, in order to change the surface gloss or to enhance the scratch resistance, the surface may be shaped in a period between after coating and before curing, or alternatively, a lubricant may be added to the resin composition.

Conductive fine particles used in the anisotropic conductive layer are selected from those of which the diameter is preferably not less than one-third, more preferably half to twice, the coating thickness of the hard coat so that the hard coat layer has anisotropic conductivity.

When the diameter of the conductive particles is less than one-third of the thickness of the hard coat layer, anisotropic conductivity is not developed in the hard coat layer, unfavorably resulting in unsatisfactory antistatic properties.

The volume resistivity in the thickness direction of the hard coat layer is preferably not more than $10^8$ Ω·cm, more preferably not more than $10^3$ Ω·cm. When the volume resistivity exceeds $10^8$ Ω·cm, good antistatic properties cannot be provided.

Conductive fine particles used in the anisotropic conductive layer are particularly preferably resin particles that have been surface treated with gold and/or nickel.

The following examples further illustrate the present invention.

EXAMPLE 1

Shintron C-4456-S7 (a tradename of a hard coating agent (solid content 45%) with ATO dispersed therein, manufactured by Shinto Paint Co., Ltd.) was coated on one side of a 188 μm-thick polyester film A-4350 (substrate film 1, manufactured by Toyobo Co., Ltd.). The coating was dried and then cured by irradiation with ultraviolet light to form a 1 μm-thick conductive layer 2. PET-D31 (a tradename of a hard coating agent, manufactured by Dainichiseika Color & Chemicals Manufacturing. Co., Ltd.) was diluted with toluene and then coated on the conductive layer 2, and the coating was then dried. The dried coating was cured by irradiation with an ionizing radiation to form a 7.5 μm-thick hard coat 3. Thus, an antistatic hard coat film 5 of Example 1 shown in FIG. 1 was prepared which comprised a substrate film 1 and two layers, a conductive layer 2 and a hard coat 3, provided on the substrate film 1.

EXAMPLE 2

As shown in FIG. 2, Shintron C-4456-S7 as used in Example 1 was coated on one side of a polyester film A-4350 (a substrate film 1) as used in Example 1, and the coating was dried and then cured by irradiation with ultraviolet light to form a 1 μm-thick conductive layer 2. Subsequently, Bright 20GNR4,6-EH (a trade name of conductive fine particles 4 comprising resin particles (benzoguanamine) having an average particle diameter of 5 μm which have been surface treated with gold and nickel, manufactured by Nippon Chemical Industrial Co., Ltd.) was dispersed in an amount of 0.1% by weight in PET-D31 as used in Example 1, and the dispersion was diluted with toluene to prepare a coating liquid. The coating liquid was coated on the conductive layer 2, and the coating was dried and then cured by irradiation with an ionizing radiation to form a 7.5 μm-thick anisotropic conductive hard coat 31. Thus, an antistatic hard coat film 5 of Example 2 shown in FIG. 2 was prepared which comprised a substrate film 1 and two layers, a conductive layer 2 and an anisotropic conductive hard coat 31, provided on the substrate film 1.

EXAMPLE 3

Figure 3:
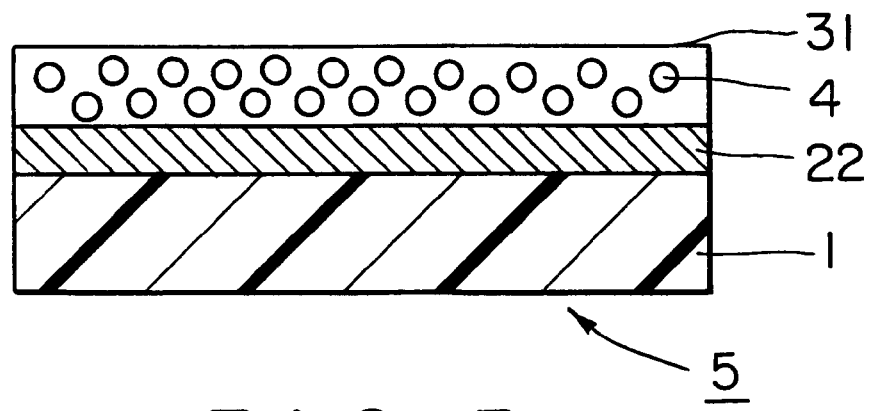
FIG. 3 is a schematic cross-sectional view showing an antistatic hard coat film according to another embodiment of the present invention.

The procedure of Example 2 was repeated, except that a conductive thin layer 22 was formed by sputtering of ITO on the same substrate film 1 as used in Example 1 under the following conditions. Thus, an antistatic hard coat film 5 of Example 3 shown in FIG. 3 was prepared which comprised a substrate film 1 and two layers, a conductive thin layer 22 and an anisotropic conductive hard coat 31, provided on the substrate film 1.

Conditions for formation of conductive layer: sputtering of ITO

Degree of vacuum: $5 \times 10^{-6}$ Torr, substrate temp.: room temp., argon gas introduction rate: 100 scc/min, oxygen introduction rate: 5 cc/min, deposition rate: 1.6 Å, and thickness of ITO: 105 nm.

EXAMPLE 4

As shown in FIG. 4, Shintron C-4456-S7 as used in Example 1 was coated on one side of a polyester film A-4350 (a substrate film 1) as used in Example 1, and the coating was dried and then cured by irradiation with ultraviolet light to form a 1 μm-thick conducive layer 2. Subsequently, Bright 20GNR4,6-EH as used in Example 2 was dispersed in an amount of 0.1% by weight in PET-D31 as used in Example 1, and the dispersion was diluted with toluene to prepare a coating liquid. The coating liquid was coated on the conductive layer 2. PTH-25 (a trade name of a shaping film, manufactured by Unitika Ltd.) (not shown) was laminated on the coating, the coating was cured by irradiation with an ionizing radiation, and the shaping film was then separated and removed to form a 7.5 μm-thick anisotropic conductive hard coat 32 having surface irregularities. Thus, an antistatic hard coat film 5 of Example 4 shown in FIG. 4 was prepared which comprised a substrate film 1 and two layers, a conductive layer 2 and an anisotropic conductive hard coat 32 having surface irregularities, provided on the substrate film 1.

EXAMPLE 5

As shown in FIG. 5, Shintron C-4456-S7 as used in Example 1 was coated on one side of a polyester film A-4350 (a substrate film 1) as used in Example 1, and the coating was dried and then cured by irradiation with ultraviolet light to form a 1 μm-thick conductive layer 2. Subsequently, a matte conductive coating liquid having the following composition was coated on the conductive layer 2, and the coating was dried and then cured by irradiation with an ionizing radiation to form a 7.5 μm-thick matted, anisotropic conductive hard coat 33 on the conductive layer 2. Thus, an antistatic hard coat film 5 of Example 5 shown in FIG. 5 was prepared which comprised a substrate film 1 and two layers, a conductive layer 2 and a matted, anisotropic conductive hard coat 33, provided on the substrate film 1.

Composition of matte, conductive coating liquid (solid content ratio):

| | |
|---|---|
| Silica (average particle diameter 1.5 μm) | 3 parts by weight |
| Bright 20GNR4,6-EH (conductive fine particles) | 0.1 part by weight |
| Seika Beam EXG 40-77 (S-2) (Seika Beam (tradename): ionizing radiation curing resin, manufactured by Dainichiseika Color & Chemicals Manufacturing. Co., Ltd.) | 100 parts by weight |

EXAMPLE 6

Bright GNC-Gr (a trade name of conductive fine particles 4 comprising carbon particles having an average particle diameter of 12 μm which have been surface treated with gold and nickel, manufactured by Nippon Chemical Industrial Co., Ltd.) was dispersed in an amount of 0.1% by weight in PET-D31, and the dispersion was diluted with toluene to prepare a coating liquid. The coating liquid was coated on a conductive layer 2 formed in the same manner as in Example 2, and the coating was dried and then cured by irradiation with an ionizing radiation to form a 12 μm-thick anisotropic conductive hard coat 31. Thus, an antistatic hard coat film 5 of Example 6 shown in FIG. 2 was prepared which comprised a substrate film 1 and two layers, a conductive layer 2 and an anisotropic conductive hard coat 31, provided on the substrate film 1.

EXAMPLE 7

Bright 6GNM5-Ni (a trade name of conductive fine particles 4 comprising nickel particles having an average particle diameter of 7 μm which have been surface treated with gold, manufactured by Nippon Chemical Industrial Co., Ltd.) was dispersed in an amount of 0.1% by weight in PET-D31, and the dispersion was diluted with toluene to prepare a coating liquid. The coating liquid was coated on a conductive layer 2 formed in the same manner as in Example 2, and the coating was dried and then cured by irradiation with an ionizing radiation to form an 8 μm-thick anisotropic conductive hard coat 31. Thus, an antistatic hard coat film 5 of Example 7 shown in FIG. 2 was prepared which comprised a substrate film 1 and two layers, a conductive layer 2 and an anisotropic conductive hard coat 31, provided on the substrate film 1.

Comparative Example 1

A hard coating agent (PET-D31) as used in Example 1 was diluted with toluene to prepare a coating liquid which was then coated on one side of a polyester film A-4350 (a substrate film 1) as used in Example 1. The coating was dried and then cured by irradiation with an ionizing radiation. Thus, a hard coat film 6 of Comparative Example 1 shown in FIG. 6 was prepared which comprised a substrate film 1 having thereon a single layer, that is, a 7.5 μm-thick hard coat 3.

Comparative Example 2

Shintron C-4456-S7 as used in Example 1 was coated on one side of a polyester film A-4350 (a substrate film 1) as used in Example 1. The coating was dried and then cured by irradiation with ultraviolet light. Thus, a hard coat film 6 of Comparative Example 2 shown in FIG. 7 was prepared which comprised a substrate film 1 having thereon only a 7.5 μm-thick conductive hard coat 21.

Comparative Example 3

A hard coating agent PET-D31 was diluted with toluene to prepare a coating liquid which was then coated on one side of a polyester film A-4350 (a substrate film 1) as used in Example 1. The coating was dried and then cured by irradiation with an ionizing radiation to form a 7.5 μm-thick hard coat 3. Further, Shintron C-4456-S7 as used in Example 1 was coated on the hard coat 3, and the coating was dried and then cured by irradiation with ultraviolet light to form a 1 μm-thick conductive layer 21. Thus, a hard coat film 6 of Comparative Example 3 shown in FIG. 8 was prepared.

Comparative Example 4

Shintron C-4456-S7 was coated on one side of a polyester film A-4350 (a substrate film 1) as used in Example 1 in the same manner as in Example 1, and the coating was dried and then cured by irradiation with ultraviolet light to form a 1 μm-thick conducive layer 2. Subsequently, Bright 20GNR4, 6-EH as used in Example 2 was dispersed in an amount of 0.1% by weight in PET-D31, and the dispersion was diluted with toluene to prepare a coating liquid. The coating liquid was gravure-coated on the conductive layer 2, and the coating was dried and then cured by irradiation with an ionizing radiation to form a 16 μm-thick anisotropic conductive hard coat. Thus, an antistatic hard coat film 6 of Comparative Example 4 shown in FIG. 9 was prepared which comprised a substrate film 1 and two layers, a conductive layer 2 and an anisotropic conductive hard coat 34, provided on the substrate film 1.

The samples of the examples and the comparative examples were evaluated for the following items, and the results are summarized in Table 1.

Total light transmittance of laminate:

The total light transmittance was measured with "Reflection Transmissometer HR-100," manufactured by Murakami Color Research Laboratory. In this case, 1st layer represents the measured value for the layer coated directly on the substrate film, 2nd layer represents the measured value for the hard coat film provided on the 1st layer, and 2nd layer* represents the measured value for the case where only the 2nd layer was coated directly on the substrate film.

Pencil hardness:

MITSUBISHI UNI 2H was reciprocated five strokes on the sample using a "simplified pencil scratch tester," manufactured by Takuma Seiko Co., Ltd. under conditions of load 1 kg and 10 mm. The sample was then visually inspected for a scratch. The number of strokes, in which the scratch was not created, was determined to evaluate the pencil hardness.

Surface resistivity:

The surface resistivity was measured with a "Resistivity Meter MCP-HT 260," manufactured by Mitsubishi Chemical Corporation each time each of the layers was formed.

TABLE 1

| Evaluation item | Surface resistivity, Ω/□ | | | Total light transmittance, % | Pencil hardness |
| --- | --- | --- | --- | --- | --- |
| | 1st layer | 2nd layer | 2nd layer* | | |
| Ex. 1 | $2 \times 10^7$ | $2 \times 10^{12}$ | $2 \times 10^{14}$ | 90.8 | 5/5 |
| Ex. 2 | $2 \times 10^7$ | $2 \times 10^7$ | $5 \times 10^{13}$ | 90.4 | 5/5 |
| Ex. 3 | $6 \times 10^1$ | $3 \times 10^2$ | $4 \times 10^{13}$ | 90.1 | 5/5 |
| Ex. 4 | $2 \times 10^7$ | $2 \times 10^7$ | $5 \times 10^{13}$ | 89.8 | 5/5 |
| Ex. 5 | $2 \times 10^7$ | $3 \times 10^7$ | $6 \times 10^{13}$ | 89.3 | 5/5 |
| Ex. 6 | $2 \times 10^7$ | $2 \times 10^7$ | $6 \times 10^{13}$ | 90.1 | 5/5 |
| Ex. 7 | $2 \times 10^7$ | $3 \times 10^7$ | $5 \times 10^{13}$ | 90.3 | 5/5 |
| Com. Ex. 1 | $2 \times 10^{14}$ | — | — | 90.2 | 5/5 |
| Com. Ex. 2 | $5 \times 10^6$ | — | — | 64.7 | 0/5 |
| Com. Ex. 3 | $2 \times 10^{14}$ | $4 \times 10^8$ | $2 \times 10^7$ | 88.6 | 0/5 |
| Com. Ex. 4 | $2 \times 10^7$ | $3 \times 10^{13}$ | $>10^{14}$ | 89.6 | 5/5 |

According to the antistatic hard coat film of the present invention, a conductive layer, which does not inhibit the total light transmittance although the scratch resistance is poor, is provided on a substrate film, and an anisotropic conductive hard coat having excellent scratch resistance, preferably containing gold- and/or nickel-treated particles as conductive fine particles, is provided on the conductive layer. By virtue of this construction, the antistatic hard coat film as a whole has low surface resistivity and at the same time possesses excellent scratch resistance.

What is claimed is:

1. An antistatic hard coat film comprising:

a transparent substrate film;

a transparent conductive layer having a surface resistivity of not more than $10^{12} \Omega/\square$; and a hard coat layer having a volume resistivity in the thickness direction of not more than $10^{8} \Omega \cdot cm$ provided on the transparent conductive layer, said hard coat layer comprising hard coat resin containing conductive fine particles, the diameter of the conductive fine particles being not less than one-third of the coating thickness of the conductive layer.

2. The antistatic hard coat film according to claim 1, wherein the hard coat layer comprises a reaction-curing resin composition.

3. The antistatic hard coat film according to claim 2, wherein the hard coat layer has a thickness of 1 to 50 $\mu$m.

4. The antistatic hard coat film according to claim 1, wherein the conductive fine particles are particles that have been surface treated with gold and/or nickel.

5. The antistatic hard coat film according to claim 4, wherein the particles are selected from the group consisting of silica, carbon black, metallic, and resin particles.

* * * * *